United States Patent Office 3,542,864
Patented Nov. 24, 1970

3,542,864
PROCESS FOR THE PRODUCTION OF PERFLUO-ROALKANESULFONYL FLUORIDES
Robert J. Koshar, Lincoln Township, Washington County, Minn., assignor to Minnesota Mining and Manufacturing Company, St. Paul, Minn., a corporation of Delaware
No Drawing. Filed July 13, 1966, Ser. No. 564,749
Int. Cl. C07c *143/70*
U.S. Cl. 260—543
6 Claims

ABSTRACT OF THE DISCLOSURE

Tetrafluoroethylene and perfluoropropylene react with sulfuryl fluoride in the presence of dissolved inorganic fluoride or cyanide ion to provide respectively perfluoroethane- or perfluoropropane-sulfonyl fluorides.

---

This invention relates to and has as its object a process for preparing perfluoroalkanesulfonyl fluorides.

Although sulfuryl fluoride is generally recognized to be relatively sluggishly reactive, it has now been found in accordance with the invention to react readily with terminal unsaturations in perfluoroalkenes, in a suitable inert solvent and in the presence of at least catalytic amounts of dissolved fluoride or cyanide, to provide perfluoroalkanesulfonyl fluorides in a manner expressed by the equation using tetrafluoroethylene as illustrative of the useful perfluoroalkene:

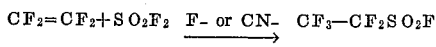

Acetonitrile, nitromethane, tetrahydrofuran, dimethylformamide, and the like, are suitable solvents in that they dissolve at least catalytic amounts of the fluoride or cyanide catalyst, and are essentially non-reactive with the sulfuryl fluoride and olefin.

Temperatures of the order of 100° C. appear to result in reasonable rates of reaction. Generally a range from about 25° to 175° C. is suitable. Because these reaction temperatures are above the boiling point of sulfuryl fluoride, and may be above the boiling points of the solvents, reaction is preferably effected under autogenous pressure in a sealed glass, stainless steel, or other vessel.

Less than stoichiometric amounts of sulfuryl fluoride may be used and the excess of perfluoroalkene recovered. The reaction is better carried out with an excess of sulfuryl fluoride, particularly a one molar, or greater excess, in order to achieve higher yields and to suppress undesirable side reactions. A large excess of sulfuryl fluoride is usually not detrimental because the excess reagent merely dilutes the reaction and is easily recovered.

Soluble fluorides, particularly alkali metal fluorides such as cesium fluoride, are suitable catalysts for the reaction. Soluble cyanides, e.g. sodium cyanide, also initiate the reaction and appear to be catalysts possibly as the result of the formation of fluoride ions in some manner. In any event, soluble cyanides appear to be the equivalent of fluorides in this reaction when used in suitable inert solvents.

The product fluorides have value for further reactions, e.g. for introducing perfluoroalkanesulfonyl groups to confer oleophobic properties, and the product fluorides are therefore valuable synthetic intermediates as described, for example, in U.S. Patent 2,732,398.

In the following examples, which more specifically illustrate the process with reference to tetrafluoroethylene and perfluoropropene, techniques are described which are pertinent to the particular fluorocarbons used. Those skilled in the art will readily recognize alternative and equivalent techniques. Parts hereinbelow are by weight where not otherwise specified.

EXAMPLE 1

A stainless steel pressure vessel is charged with an essentially anhydrous mixture of 3 parts of perfluoropropene, 3.1 parts (50 mole percent excess) of sulfuryl fluoride, 0.3 parts of cesium fluoride and 10 parts by volume of acetonitrile. The vessel is heated with shaking to 100° C. over about 3 hours and held at that temperature for about 60 hours. The resulting reaction mixture containing the desired product is fractionated by conventional procedures, for example, by distillation or by condensing under vacuum in a series of traps at progressively lower temperatures of −63° C., −110° C. and −196° C. Perfluoro-2-propanesulfonyl fluoride, $(CF_3)_2CFSO_2F$, is more volatile than the acetonitrile solvent and less volatile than sulfuryl fluoride and condenses mainly at the intermediate temperature. It is conveniently purified by preparative gas chromatography. Perfluoro-2-propanesulfonyl fluoride is a colorless liquid, B.P. 38° C.

*Analysis.*—Calculated for $C_3F_8O_2S$: 14.3% C.; 60.3% F.; M.W. 252. Found: 14.1% C.; 60.4% F.; M.W. 252.

Infrared absorption of the sulfonyl group at 6.73 microns is exhibited and also $F^{19}$ nuclear magnetic resonance peaks at $-55.0\phi^*(-SO_2F)$, $72.5\phi^*(-CF_3)$ and $167.4\phi^*(-CF-)$ using $CFCl_3$ as internal reference.

The reaction is carried out by the same procedure with the formation of perfluoro-2-propanesulfonyl fluoride when dimethylformamide is used as the solvent or when potassium fluoride or other soluble fluorides are used as catalyst.

EXAMPLE 2

A mixture of 0.7 millimole of tetrafluoroethylene, 1.5 millimoles of sulfuryl fluoride, 4 mg. of cesium fluoride and 0.2 ml. of acetonitrile is sealed under vacuum in a borosilicate glass tube and heated with shaking at 110° C. for 60 hours. The tube is cooled and the components separated by conventional fractionation procedures. Perfluoroethanesulfonyl fluoride, $CF_3CF_2SO_2F$, is separated and is identified by its infrared absorption spectrum and its nuclear magnetic resonance spectrum.

EXAMPLE 3

A mixture of 0.7 millimole of perfluoropropene, 1.5 millimoles of sulfuryl fluoride, 4 mg. of sodium cyanide and 0.2 ml. of dimethylformamide is sealed under vacuum and shaken at 105° C. for 16 hours. Perfluoro-2-propanesulfonyl fluoride is isolated in 0.26 millimole yield by the procedures described in Example 2.

Essentially the same overall results are achieved by repeating Examples 2 and 3 on larger scales, e.g., using molar and gram amounts.

What is claimed is:
1. A process for the production of perfluoro-loweralkanesulfonyl fluorides comprising reacting terminally unsaturated lower perfluoroalkene of 2–3 carbon atoms and sulfuryl fluoride in the presence of an alkali metal fluoride or cyanide in an inert mutual solvent for said perfluoroalkene and said sulfuryl fluoride further capable of dissolving at least catalytic amounts of said alkali metal fluoride or cyanide.
2. A process according to claim 1 wherein the fluoride is cesium fluoride.
3. A process according to claim 1 wherein the cyanide is sodium cyanide.
4. A process according to claim 1 wherein the solvent is acetonitrile.
5. A process according to claim 1 wherein the lower perfluoroalkene is tetrafluoroethylene.

6. A process according to claim 1 wherein the lower perfluoroalkene is hexafluoropropene.

References Cited

UNITED STATES PATENTS 3,113,967   12/1963   Fawcett _____ 260—544

FOREIGN PATENTS 869,922   6/1961   Great Britain.

LORRAINE A. WEINBERGER, Primary Examiner

E. J. GLEIMAN, Assistant Examiner